(12) United States Patent
Hirai

(10) Patent No.: US 6,369,380 B1
(45) Date of Patent: Apr. 9, 2002

(54) LIGHT RECEIVER UNIT HAVING A LIGHT RECEIVING ELEMENT AND A PACKAGING COVER

(75) Inventor: Isamu Hirai, Tokyo (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/362,884

(22) Filed: Jul. 29, 1999

(30) Foreign Application Priority Data

Aug. 7, 1998 (JP) .......................................... 10-224076

(51) Int. Cl.⁷ .............................. G03B 7/099; H01J 5/02
(52) U.S. Cl. ....................................... 250/239; 250/226
(58) Field of Search .................................. 250/226, 239; 257/680, 687, 434, 433, 432, 431; 438/64, 65

(56) References Cited

U.S. PATENT DOCUMENTS

| | | | | |
|---|---|---|---|---|
| 5,278,607 A | * | 1/1994 | Goto et al. ................. | 354/476 |
| 5,289,002 A | * | 2/1994 | Tarn ........................... | 250/239 |
| 5,326,968 A | * | 7/1994 | Johnson et al. ............. | 250/225 |
| 5,821,532 A | * | 10/1998 | Beaman et al. ............. | 250/239 |
| 5,883,386 A | * | 3/1999 | Tsuyuki et al. ............. | 250/239 |
| 5,949,073 A | * | 9/1999 | Shimoyama ............... | 250/338.4 |

* cited by examiner

*Primary Examiner*—John R. Lee
*Assistant Examiner*—Bradford Hill
(74) *Attorney, Agent, or Firm*—Greenblum & Bernstein, P.L.C.

(57) ABSTRACT

Disclosed is a light receiver unit having a packaging cover and a light receiving element positioned in an inner space of the packaging cover wherein a resin is injected into the inner space to be solidified. The light receiver unit includes: a window hole formed on the packaging cover, a filter fixed to the packaging cover to cover the window hole, and a transparent plane-parallel plate fixed to the packaging cover to cover the filter from the inside of the packaging cover, the transparent plane-parallel plate being harder that the filter; whereby the filter is protected from any pressure caused by the injected resin.

13 Claims, 2 Drawing Sheets

LIGHT RECEIVER UNIT HAVING A LIGHT RECEIVING ELEMENT AND A PACKAGING COVER

BACKGROUND OF THE INVENTION

1. Field of the Invention

The present invention relates to a light receiver unit having a light receiving element therein that is used for a photometering device of a camera.

2. Description of the Related Art

FIG. 4 shows a conventional light receiver unit which is provided with a circuit board 1, a light receiving element (e.g., SPD [silicon photo diode]) 2, a packaging cover 3, a filter 5 and a resin (transparent thermosetting resin) 7. The light receiving element 2 that is secured to the circuit board 1 is covered by the packaging cover 3. The packaging cover 3 is provided with a window hole 4, a recessed portion 4a formed around the window hole 4, an injection hole 6 and a vent 8. A lens 9 (shown by a two-dot chain line in FIG. 4) for converging the incident light onto the light receiving element 2 is positioned adjacent to the window hole 4. The filter 5 for adjusting the luminosity factor or absorbing infrared rays is fixed to the recessed portion 4a. With the packaging cover 3 fixed on the circuit board 1, the resin 7 is injected into the packaging cover 3 through the injection hole 6 while forcing the internal air out of the packaging cover 3 through the vent 8, to thereby fill the resin 7 in the closed space (inner space) formed between the packaging cover 3 and the circuit board 1. After the resin 7 has filled up the space between the packaging cover 3 and the circuit board 1, the resin 7 is heated in order to be solidified, in order to protect the light receiving element 2. Accordingly, irregular reflection can be prevented from occurring at the window hole 4, at the boarder between the air and the resin 7, since the outer surface 5a of the filter 5 is a plane. Consequently, precision in photometering using the light receiving element 2 is improved for the spot metering, evaluative metering using a plurality of zones.

The filter 5 is usually made of a hard material such as a rigid plastic, glass etc. However, since the filter made of a hard material is difficult to manufacture, and the manufacturing method therefor being very restricted, the cost of manufacture the filter is inevitably high. Accordingly, it is preferable that a soft flexible material which can be easily processed be used as the filter 5. However, if such a flexible material is used as the filter 5, the filter 5 can be deformed due to the pressure applied thereto, generated when the resin 7 is fully injected and/or due to the expansion and contraction of the resin 7 when the resin 7 is heated in order to be solidified. This causes the outer plane surface 5a of the filter 5 to deform, which deteriorates the precision in photometering using the light receiving element 2.

SUMMARY OF THE INVENTION

The primary object of the present invention is to provide a light receiver unit having a light receiving element, wherein a soft flexible filter can be used without deteriorating the precision in photometering while increasing the degree of freedom for the selection of filter.

To achieve the object mentioned above, according to an aspect of the present invention, there is provided a light receiver unit having a packaging cover and a light receiving element positioned in an inner space of the packaging cover wherein a resin is injected into the inner space to be solidified. The light receiver unit includes: a window hole formed on the packaging cover, a filter fixed to the packaging cover to cover the window hole, and a transparent plane-parallel plate fixed to the packaging cover to cover the filter from the inside of the packaging cover, the transparent plane-parallel plate being harder that the filter; whereby the filter is protected from any pressure caused by the injected resin.

Preferably, transparent plane-parallel plate is attached to the filter.

Preferably, the transparent plane-parallel plate is apart from the filter to form a gap therebetween.

The transparent plane-parallel plate can be a bandpass filter.

Preferably, the packaging cover includes: an injection hole through which the resin is injected into the inner space of the packaging cover; and a vent through which air in the inner space is forced out of the packaging cover when the resin is injected through the injection hole.

Preferably, a circuit board is further included, on which the light receiving element is fixed, the packaging cover being fixed to the circuit board to cover the light receiving element.

Preferably, the packaging cover includes a recessed portion formed on an inner surface of the packaging cover around the window hole, the filter and the transparent plane-parallel plate being fixed to the recessed portion.

Preferably, the packaging cover includes: an outer smaller recessed portion formed on an inner surface of the packaging cover around the window hole; and an inner larger recessed portion formed on an inner surface of the packaging cover around the outer recessed portion, whereby a stepped portion is formed on an inner peripheral surface of the window hole, wherein the filter and the transparent plane-parallel plate are fixed to the outer recessed portion and the inner recessed portion, respectively.

Preferably, the thickness of the filter is smaller than the depth of the outer recessed portion to form a gap between the filter and the transparent plane-parallel plate.

Preferably, the transparent plane-parallel plate is attached to the filter so that the filter and the transparent plane-parallel plate is provided as a layered plate.

Preferably, the resin is a thermosetting resin.

The filter can be a filter for adjusting the luminosity factor, or alternatively, the filter can be a filter for absorbing infrared rays.

According to another aspect of the present invention, there is provided a light receiver unit including: a light receiving element fixed on a circuit board; a packaging cover fixed on the circuit board to cover the light receiving element, the packaging cover forming a space between the light receiving element and the cover; a resin which is injected into the space to be solidified; a window hole which is formed on the packaging cover and through which light enters the packaging cover to be incident on the light receiving element; a filter for adjusting the luminosity factor or absorbing infrared rays fitted in the window hole; and a transparent plane-parallel plate fixed to the packaging cover adjacent to the filter to tightly separate the filter from the space into which the resin is injected.

The present disclosure relates to subject matter contained in Japanese Patent Application No. 10-224076 (filed on Aug. 7, 1998) which is expressly incorporated herein by reference in its entirety.

BRIEF DESCRIPTION OF THE DRAWINGS

The present invention will be described below in detail with reference to the accompanying drawings in which.

DESCRIPTION OF THE PREFERRED EMBODIMENTS

Figure 1:
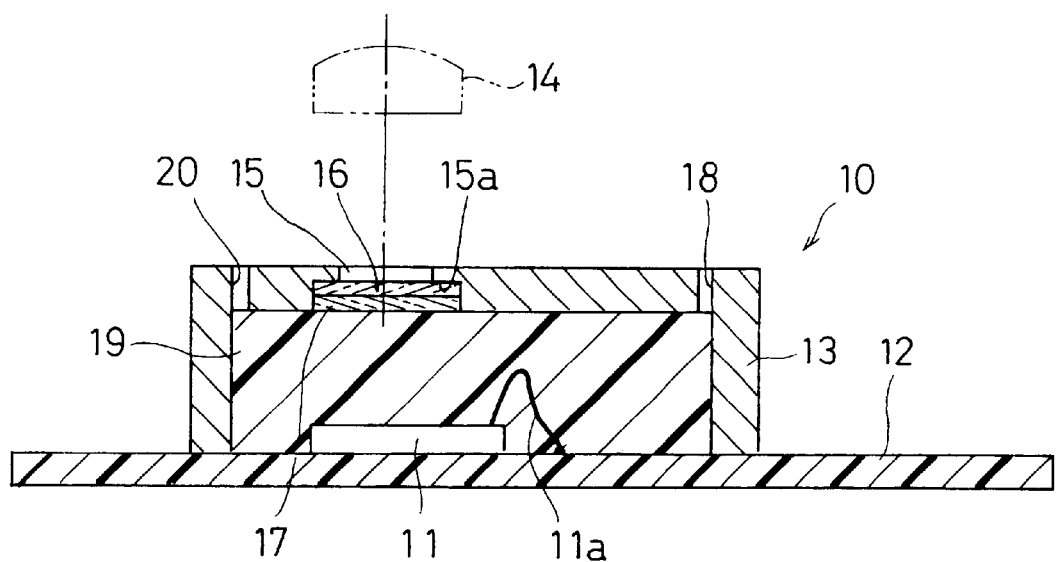
FIG. 1 is a cross sectional view of the first embodiment of a light receiver unit to which the present invention is applied, showing fundamental elements thereof.
Figure 2:
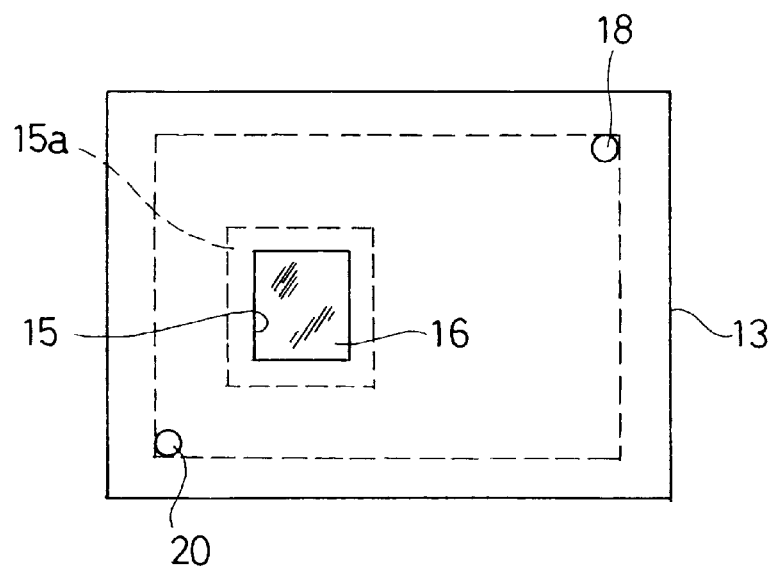
FIG. 2 is a plan view of the light receiver unit shown in FIG. 1.

FIGS. 1 and 2 show the first embodiment of a light receiver unit. A light receiver unit 10 is provided with a light receiving element 11, a circuit board 12, a packaging cover 13, and a lens 14. The packaging cover 13 can be made of (for example) metal. The lens 14 is a condenser lens for converging the incident light onto the light receiving element 11.

The light receiving element 11 is fixed to the circuit board 12 and connected to a predetermined terminal (not shown) on the circuit board 12 via an electric wire 11a. The packaging cover 13 covers the light receiving element 11 and is fixed to the circuit board 12. The packaging cover 13 is provided with a window hole 15, a recessed portion 15a formed around the inner side of the window hole 15, an injection hole 18, and a vent 20. A layered plate, which includes a filter 16 for adjusting luminosity factor or absorbing infrared rays and a transparent plane-parallel plate 17 attached to the filter 16 for backing the filter 16, is fixed to the recessed portion 15a.

The filter 16 is in the form of a film made of a soft flexible material, while the transparent plane-parallel plate 17 is made of a material harder than that of the filter 16, e.g., glass or hard plastic. In general, a soft flexible filter is easier to manufacture and can be produced at a lower cost than a hard filter. The transparent plane-parallel plate 17 is made of a material having a sufficient hardness which resists the pressure generated when a resin (transparent thermosetting resin) 19 is injected into the packaging cover 13 and also the pressure due to the expansion and contraction of the injected resin 19. The resin 19 is injected into the packaging cover 13 through the injection hole 18 while forcing the internal air out of the vent 20 to fill the resin 19 in the closed space (inner space) formed between the packaging cover 13 and the circuit board 12. After the space is filled up the resin 19, the resin 19 is heated in order to be solidified, so that the light receiving element 11 is protected from moisture and is protected from any vibration or impact which may deteriorate photometering precision.

According to the first embodiment mentioned above, since the light receiver unit 10 is provided with the transparent plane-parallel plate 17 for reinforcing the filter 16, the filter 16 can be prevented from being deformed against pressure generated when the resin 19 is injected into the packaging cover 13 and also pressure due to the expansion and contraction of the injected resin 19, even if the filter 16 is formed as a soft flexible film.

In comparison, if the flexible filter is positioned between the light receiver unit 10 and the lens 14, it is necessary to provide a member for supporting the filter between the light receiver unit 10 and the lens 14, which increases the number of elements of the light receiver unit, thus resulting in a higher cost of production. However, according to the present embodiment, the filter 16 is incorporated in the light receiver unit 10, so that an appropriate filter can be selected to be used as the filter 16 without increasing the cost of production.

Figure 3:
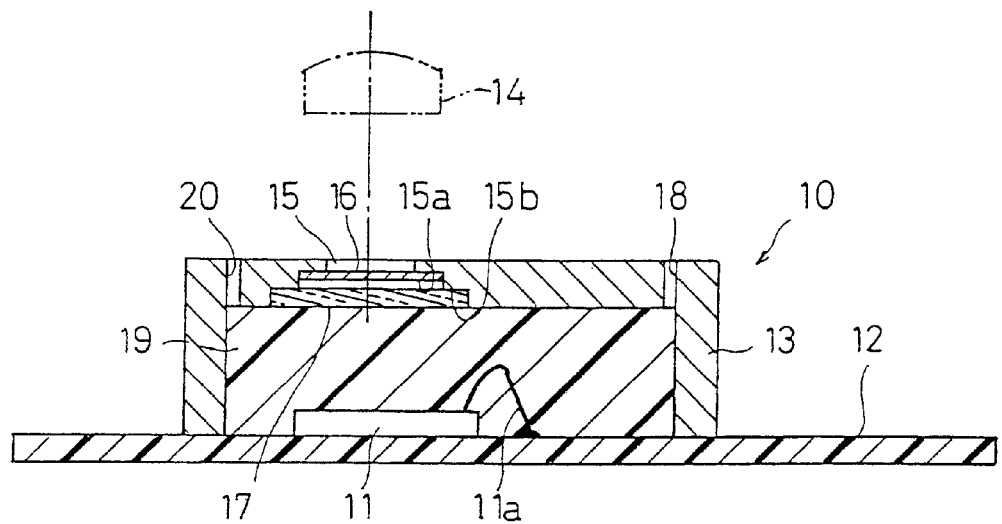
FIG. 3 is a cross sectional view of the second embodiment of a light receiver unit to which the present invention is applied, showing fundamental elements thereof.
Figure 4:
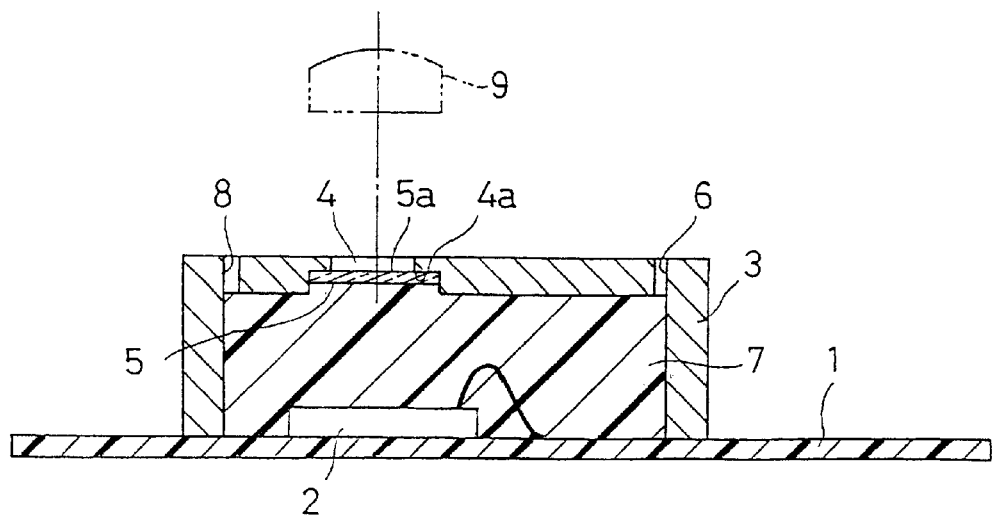
FIG. 4 is a cross sectional view of a conventional light receiver unit, showing fundamental elements thereof.

In the first embodiment shown in FIGS. 1 and 2, the layered plate which includes the filter 16 and the transparent plane-parallel plate 17 attached to the filter 16 is fixed to the recessed portion 15a of the window hole 15; however, the filter 16 and the transparent plane-parallel plate 17 can be provided separately. FIG. 3 shows the second embodiment of the light receiver unit having a structure wherein the filter 16 and the transparent plane-parallel plate 17 are provided separately. In the second embodiment, elements or parts which are similar to those in the first embodiment are designated by the same reference numerals. As shown in FIG. 3, the packaging cover 13 is provided with two stepped recessed portions, i.e., outer and inner recessed portions 15a and 15b formed around the window hole 15. Specifically, the outer (smaller) recessed portion 15a is formed around the window hole 15 and the lower (larger) recessed portion 15b is formed around the outer recessed portion 15a so as to form a stepped portion on the inner peripheral surface of the window hole 15. The filter 16 is fixed to the outer recessed portion 15a while the transparent plane-parallel plate 17 is fixed to the lower recessed portion 15b. The thickness of the filter 16 is smaller than the depth of the outer recessed portion 15a to form a gap between the filter 16 and the transparent plane-parallel plate 17. According to this structure of the second embodiment, since adhesion between the filter 16 and the transparent plane-parallel plate 17 does not occur even in part, a border between an adhesive portion and a non-adhesive portion thereof cannot occur, and therefore, optical irregularities can be suppressed.

In the first and second embodiments, if the transparent plane-parallel plate 17 is formed so as to have a particular function (e.g., as a bandpass filter), two different types of filters (the filter 16 and the transparent plane-parallel plate 17) can be incorporated in the light receiver unit 10, which increases the degree of freedom for the selection of the filter while improving the effect of the filter.

As can be understood from the foregoing, according to the present invention, since the transparent plane-parallel plate is fixed to the packaging cover to cover said filter from the inside of said packaging cover, a flexible filter can be used without deteriorating the precision in photometering while increasing the degree of freedom in the selection of the filter, so that an appropriate filter can be selected. Furthermore, in the case where the transparent plane-parallel plate is provided separately from the filter, the filter is reliably protected from pressure generated when the resin is injected into the packaging cover and also the pressure due to the expansion and contraction of the injected resin, which increases the degree of freedom for the selection of the filter without increasing the cost of production.

In addition, as mentioned above, since producing a soft flexible filter is easier and can be produced at a lower cost than a glass filter or a hard plastic filter, the total cost for a light receiver unit is reduced.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A light receiver unit having a packaging cover and a light receiving element positioned in an inner space of said packaging cover, a resin being injected into said inner space to be solidified, said light receiver unit comprising:

a window hole formed on said packaging cover;

a filter fixed to said packaging cover to cover said window hole; and a transparent plane-parallel plate fixed to said packaging cover to cover said filter from the inside of said packaging cover, said transparent plane-parallel plate being harder than said filter, whereby said filter is protected from any pressure caused by said injected resin, said packing cover comprises:

an outer smaller recessed portion formed on an inner surface of said packaging cover around said window hole; and an inner larger recessed portion formed on an inner surface of said packaging cover around said outer recessed portion, wherein a stepped portion is formed on an inner peripheral surface of said window hole, and wherein said filter and said transparent plane-parallel plate are fixed to said outer smaller recessed portion and said inner larger recessed portion, respectively.

2. The light receiver unit according to claim 1, wherein said transparent plane-parallel plate is attached to said filter.

3. The light receiver unit according to claim 1, wherein said transparent plane-parallel plate is apart from said filter to form a gap therebetween.

4. The light receiver unit according to claim 1, wherein said transparent plane-parallel plate comprises a bandpass filter.

5. The light receiver unit according to claim 1, wherein said packaging cover comprises: an injection hole through which said resin is injected into said inner space of said packaging cover; and a vent through which air in said inner space is forced out of said packaging cover when the resin is injected through the injection hole.

6. The light receiver unit according to claim 1, further comprising a circuit board on which said light receiving element is fixed, said packaging cover being fixed to said circuit board to cover said light receiving element.

7. The light receiver unit according to claim 1, wherein said packaging cover comprises a recessed portion formed on an inner surface of said packaging cover around said window hole, said filter and said transparent plane-parallel plate being fixed to said recessed portion.

8. The light receiver unit according to claim 1, wherein the thickness of said filter is smaller than the depth of said outer recessed portion to form a gap between said filter and said transparent plane-parallel plate.

9. The light receiver unit according to claim 1, wherein said transparent plane-parallel plate is attached to said filter so that said filter and said transparent plane-parallel plate is provided as a layered plate.

10. The light receiver unit according to claim 1, wherein said resin is a thermosetting resin.

11. The light receiver unit according to claim 1, wherein said filter is a filter for adjusting the luminosity factor.

12. The light receiver unit according to claim 1, wherein said filter is a filter for absorbing infrared rays.

13. A light receiver unit comprising:

a light receiving element fixed on a circuit board;

a packaging cover fixed on said circuit board to cover said light receiving element, said packaging cover forming a space between the circuit board and said packaging cover;

a resin which is injected into said space to be solidified;

a window hole which is formed on said packaging cover and through which light enters said package cover to be incident on said light receiving element;

a filter for adjusting the luminosity factor or absorbing infrared rays fitted in said window hole; and a transparent plane-parallel plate fixed to said packaging cover adjacent to said filter to tightly separate said filter from said space into which said resin is injected, wherein said packing cover comprises:

an outer smaller recessed portion formed on an inner surface of said packaging cover around said window hole; and an inner larger recessed portion formed on an inner surface of said packaging cover around said outer recessed portion, wherein a stepped portion is formed on an inner peripheral surface of said window hole, and wherein said filter and said transparent plane-parallel plate are fixed to said outer smaller recessed portion and said inner larger recessed portion, respectively.

* * * * *